United States Patent
Chang et al.

(10) Patent No.: US 8,005,326 B2
(45) Date of Patent: Aug. 23, 2011

(54) OPTICAL CLOCK SIGNAL DISTRIBUTION USING THROUGH-SILICON VIAS

(75) Inventors: Shih-Cheng Chang, Hsin-Chu (TW);
Jin-Lien Lin, Taoyuan (TW);
Kuo-Ching Hsu, Taipei (TW);
Kai-Ming Ching, Jhudong Township (TW); Jiun Yi Wu, Dayuan Township (TW); Yen-Huei Chen, Hsin-Chu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 57 days.

(21) Appl. No.: 12/170,570

(22) Filed: Jul. 10, 2008

(65) Prior Publication Data
US 2010/0008620 A1    Jan. 14, 2010

(51) Int. Cl.
*G02B 6/12* (2006.01)
(52) U.S. Cl. ......................................................... 385/14
(58) Field of Classification Search .................... 385/14, 385/49
See application file for complete search history.

(56) References Cited

U.S. PATENT DOCUMENTS

| | | | |
|---|---|---|---|
| 6,898,340 B2 * | 5/2005 | Tanaka | 385/14 |
| 7,266,800 B2 | 9/2007 | Sezginer | |
| 7,432,196 B2 * | 10/2008 | Tanida et al. | 438/667 |
| 2003/0094699 A1 | 5/2003 | Leas | |
| 2004/0223683 A1 | 11/2004 | Block et al. | |
| 2005/0145783 A1 | 7/2005 | Zheng | |
| 2006/0267206 A1 * | 11/2006 | Tanida et al. | 257/773 |
| 2007/0080414 A1 * | 4/2007 | Bjorkman et al. | 257/432 |
| 2008/0318360 A1 * | 12/2008 | Chen et al. | 438/106 |

OTHER PUBLICATIONS

Yang, M., et al., "A High-Speed, High-Sensitivity Silicon Lateral Trench Photodetector," IEEE Electron Device Letters, vol. 23, No. 7, Jul. 2002, pp. 395-397.

* cited by examiner

*Primary Examiner* — Sarah Hahm
(74) *Attorney, Agent, or Firm* — Slater & Matsil, L.L.P.

(57) ABSTRACT

An integrated circuit structure includes a semiconductor chip including a front surface and a back surface; a via extending from the back surface of the semiconductor chip into the semiconductor chip, wherein the via is light transparent; and a photon detector in the semiconductor chip and exposed to the via.

19 Claims, 3 Drawing Sheets

OPTICAL CLOCK SIGNAL DISTRIBUTION USING THROUGH-SILICON VIAS

TECHNICAL FIELD

This invention relates generally to optical signals for an integrated circuit, and more particularly to semiconductor chips having built-in circuits for converting optical clock signals to electrical clock signals.

BACKGROUND

Clock signals are essential to the operation of modern integrated circuits, in which the operations are synchronized by clock signals, which often contains a repeated pattern of "1010." To speed up the integrated circuits, the clock signals have to be speed up. Currently, the clock signals have the frequencies in giga hertz (GHz) ranges. It is expected that by year 2010, the clock signals will be in the range of about 15 to 20 GHz. In this range, the electrical signal begins to merge with optical signals.

With the increase in the frequencies of clock signals, more heat is generated by the clock signal circuits, for example, flip-flops. Significantly greater power consumption and more severe heat-dissipating problems are hence resulted. With the increased heating and increased frequencies, glitches and jitters also become more severe, hence preventing the further increase in the frequencies of clock signals. Various methods (U.S. Patent Publication Nos. 2005/0145783, 2005/0223683, and 2003/0094699) have been explored to introduce optical clock signals into semiconductor chips, and converting the optical clock signals in the semiconductor chips to electrical clock signals. In these methods, photon detectors are used to convert the optical clock signals to the electrical clock signals.

The conventional methods, however, suffer from drawbacks. For example, if the optical signal is introduced into substrates from the front sides of the respective semiconductor chips, then the metallization layers, which already have high densities, will prevent efficient allocation of optical detectors. Further, the converted electrical signal may need to pass a plurality of metallization layers before they reach the logic gates. Therefore, the cost and manufacturing complexity increase. If, however, the optical paths are placed on the back of the substrates, since silicon substrates are substantially opaque to most of the commonly used wavelengths, the wavelength of the light needs to be increased in order to penetrate through silicon substrates. This not only applies extra requirements to the optical source, the strength of light received by the photon detectors will also be attenuated, and hence the optical detectors need to be more sensitive.

Accordingly, what is needed in the art is an integrated circuit structure that may incorporate photon detectors to take advantage of the benefits associated with reduced power consumption while at the same time overcoming the deficiencies of the prior art.

SUMMARY OF THE INVENTION

In accordance with one aspect of the present invention, an integrated circuit structure includes a semiconductor chip including a front surface and a back surface; a via extending from the back surface of the semiconductor chip into the semiconductor chip, wherein the via is light transparent; and a photon detector in the semiconductor chip and exposed to the via.

In accordance with another aspect of the present invention, an integrated circuit structure includes a semiconductor substrate including a front surface and a back surface; metallization layers over the semiconductor substrate; a through-silicon via (TSV) extending from the back surface of the semiconductor substrate into the semiconductor substrate; a photon detector in the semiconductor substrate and exposed to the TSV; and a light source attached to the semiconductor substrate, and aiming at the TSV. The light source is configured to emit light carrying clock signals, wherein the TSV is transparent to a light emitted by the light source.

In accordance with yet another aspect of the present invention, an integrated circuit structure includes a semiconductor substrate including a front surface and a back surface; metallization layers over the semiconductor substrate; a plurality of TSVs extending from the back surface of the semiconductor substrate into the semiconductor substrate; a plurality of photon detectors in the semiconductor substrate, wherein each of the plurality of photon detectors is exposed to one of the plurality of TSVs; and a light source attached to the semiconductor substrate, and is configured to project light to the plurality of TSVs. The plurality of TSVs is filled with a transparent dielectric material.

The advantageous features of the present invention include reduced heat generated by clock circuits, reduced attenuation of the light carrying the optical clock signals, and the elimination of the requirement for re-routing metallization layers for the clock circuits.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

A novel integrated circuit structure for receiving optical clock signals and converting the optical clock signals to electrical clock signals is provided. The variations and the operation of the preferred embodiments are discussed. Throughout the various views and illustrative embodiments of the present invention, like reference numbers are used to designate like elements.

Figure 1:
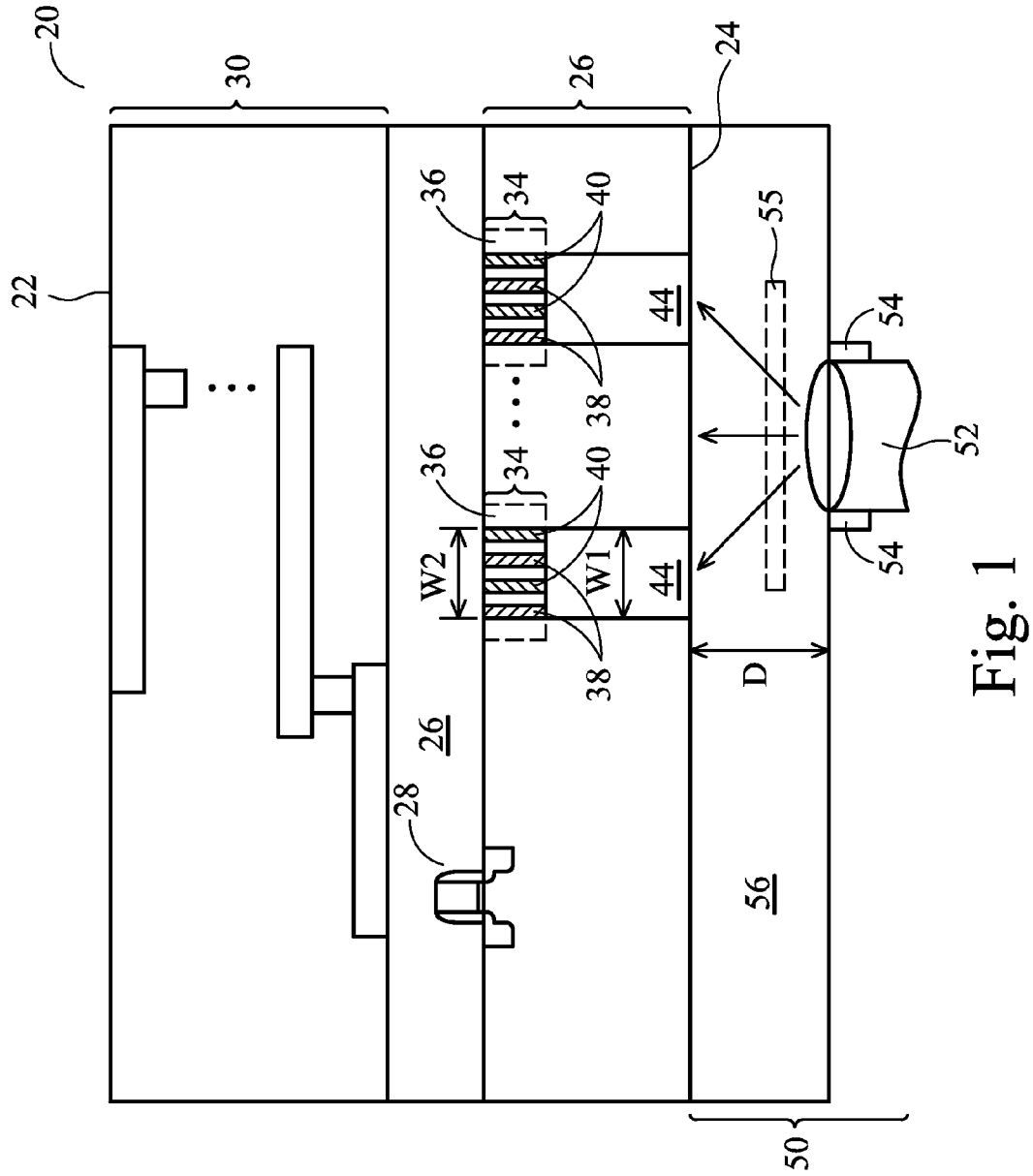
FIG. 1 illustrates an embodiment of the present invention, wherein light is received by photon detectors through through-silicon vias on the back sides of semiconductor chips.

FIG. 1 illustrates a cross-sectional view of an embodiment of the present invention, which includes chip 20. Chip 20 has front surface 22 and back surface 24. Semiconductor substrate 26 is inside chip 20. In an embodiment of the present invention, semiconductor substrate 26 is a bulk substrate formed of commonly used semiconductor materials, such as silicon, silicon germanium, or the like. In other embodiments, semiconductor substrate 26 has a silicon-on-insulator (SOI) structure (not shown in FIG. 1, please refer to FIG. 2).

Chip 20 preferably includes integrated circuits comprising, for example, complementary metal-oxide-semiconductor (CMOS) devices, wherein the integrated circuits are symbolized using transistor 28. Metallization layers 30, which may be formed of copper lines in dielectric layers, are formed over semiconductor substrate 26. The dielectric layers may be formed of low-k dielectric materials having dielectric constants less than, for example, 2.5. Further, contact pads (not shown) may be formed over metallization layers 30, and exposed through the top surface 22 (also referred to as front surface). Passivation layers (not shown) may also be formed in an upper portion of metallization layers 30.

A plurality of photon detectors 34 is formed in and adjacent to the top surface of semiconductor substrate 26. Photon detectors 34 are used to receive light, which carries optical clock signals, and convert the optical clock signals to electrical clock signals, wherein the electrical clock signals have the same frequencies as the respective optical clock signals. The optical clock signals may be coded with, for example, "1"s and "0"s in an alternating pattern, wherein the "1"s and "0"s may be represented with different light intensities. Photon detectors 34 may have different designs, and one exemplary design is shown in FIG. 1. In this embodiment, each of the photon detectors 34 includes n-well region 36 inside the p-type doped semiconductor substrate 26, wherein n-well regions 36 are lightly doped. A plurality of heavily doped n-type fingers 38 and a plurality of heavily doped p-type fingers 40 are allocated in an alternating pattern, and are separated from each other by n-well regions 36. Preferably, fingers 38 and 40 have a trench-shape extending from substantially the top surface of semiconductor substrate 26 into semiconductor substrate 26, and may be formed by implanting semiconductor substrate 26. Fingers 38 and 40 are preferably parallel to each other. Fingers 38 are interconnected, while fingers 40 are interconnected, wherein the interconnection, such as the respective silicide regions and metal connections, are not shown. Photon detectors 34, when excited by the light, generate electrons, and the number of electrons is related to the intensity of the light. Accordingly, the optical clock signals are converted to electrical clock signals.

Each of the photon detectors 34 is exposed to one of a plurality of through-silicon vias (TSV) 44, which are formed by either drilling or etching from the back surface 24 of semiconductor substrate 26 (wherein back surface 24 is also the back surface of chip 20). In an embodiment, TSVs 44 are not filled, and hence are air-gaps (also referred to as air-vias.). In alternative embodiments, TSVs 44 are filled with materials transparent for the wavelength of the light carrying the optical clock signals. Accordingly, TSVs 44 may be formed of glass, silicon nitride ($Si_3N_4$), organic materials, polymers, diamond, or the like. The material of TSVs 44 may be a dielectric material, although semiconductor materials are also usable, as long as the light can pass through them. The bottom view of TSVs 44 may be circular shaped or having any other shapes such as rectangles (including squares). The width W1 of TSVs 44 may be in the range from about 1 μm to about 10 μm, although different width W1 may be used, depending on the widths W2 of photon detectors 34. Preferably, width W1 and W2 are substantially equal to, or at least comparable to, each other.

Optical layer 50 is at the bottom of semiconductor substrate 26. In an embodiment, optical layer 50 includes light source 52 for emitting the light carrying the optical clock signals, and the spacing between light source 52 and back surface 24. In an embodiment, light source 52 includes an optical fiber or a MEMS mirror device(s) to project the light. Light source 52 may emit the light to an area including all, or some of, TSVs 44. Through TSVs 44, the light is received by photon detectors 34, and the optical clock signals are converted to electrical clock signals. Again, in the case TSVs 44 are filled, the filling material is preferably selected to have a low absorption rate for the wavelength of the light. The light source 52 is spaced apart from the bottom surface 24 of semiconductor substrate 26 by a distance D, for example, between about 100 um and about 3000 um. The preferred distance D may be affected by the chip size of the entire chip, or the circuit block area in which TSVs 44 are formed. The spacing 56 between light source 52 and bottom surface 24 may be unfilled (or in other words, filled with air), or filled with a transparent material that is usable for TSVs 44, wherein the usable materials are discussed in the preceding paragraphs. The filling material for spacing 56 may be the same as, or different from, the filling material of TSVs 44. Fixtures 54 are provided to reliably mount light source 52 onto the back of chip 20, wherein fixtures 54 may be clamps, screws, glue, or the like.

Optionally, a light distributor 55 is mounted between light source 52 and TSVs 44, wherein light distributor 55 is used to redistribute light toward TSVs 44 (for example, using the method taught in U.S. Pat. No. 7,266,800), but not the spacings between TSVs 44, so that the light can be relatively focused, resulting in greater light strengths for each of photon detectors 34.

Figure 2:
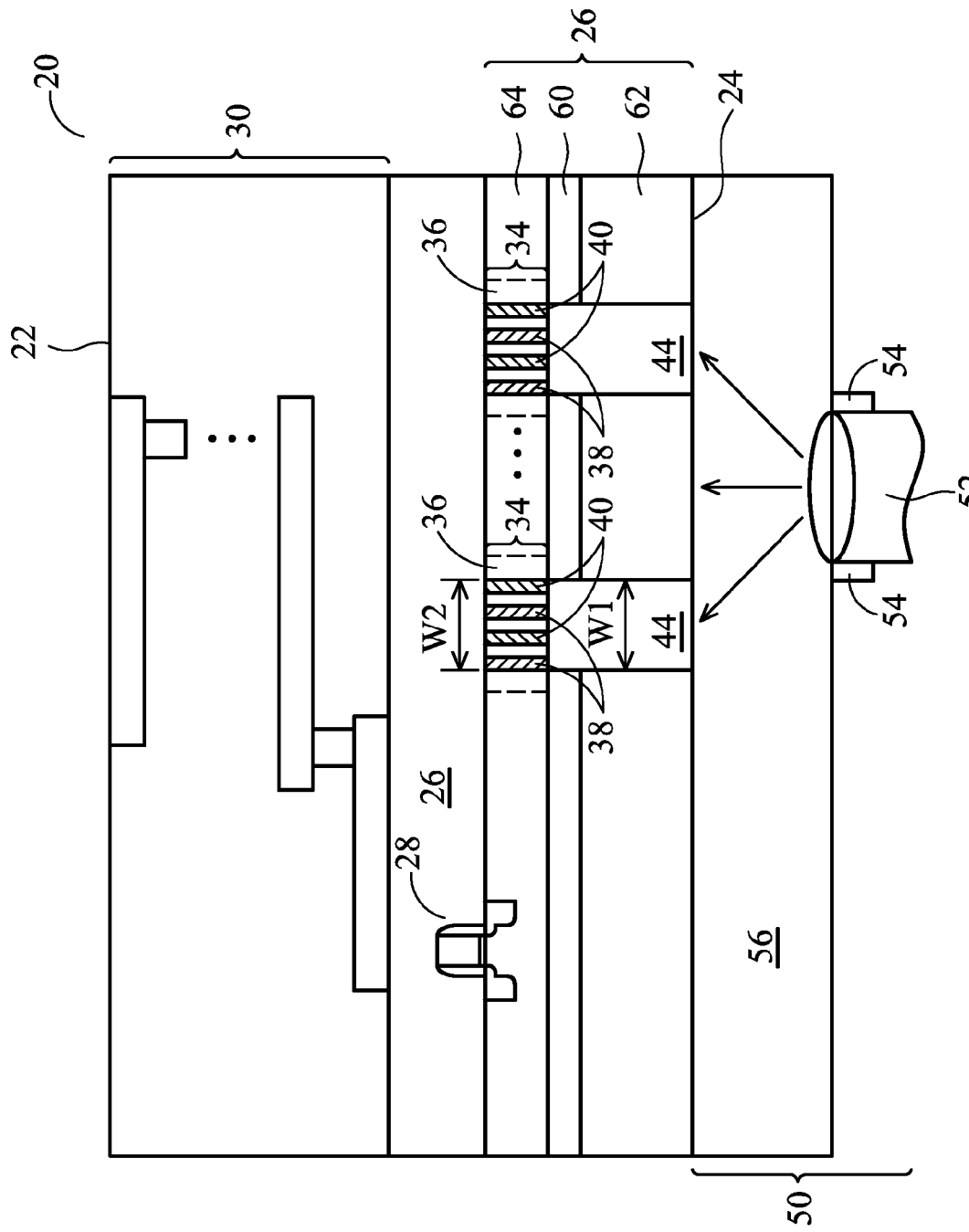
FIG. 2 illustrates an embodiment formed on a silicon-on-insulator substrate.

FIG. 2 illustrates an alternative embodiment of the present invention, wherein substrate 26 has a silicon-on-insulator (SOI) structure including oxide layer 60, semiconductor layer 62, and semiconductor layer 64, wherein the semiconductor layers 62 and 64 may be formed of commonly used materials such as silicon or silicon germanium. In this embodiment, photon detectors 34 extend down all the way to oxide layer 60. When forming TSVs 44, oxide layer 60 may be used as an etch stop layer, so that the formation of TSVs 44 may be more precise. As a comparison, in a bulk substrate as shown in FIG. 1, a time mode may be used to etch semiconductor substrate 26 in order to form TSVs 44.

Figure 3:
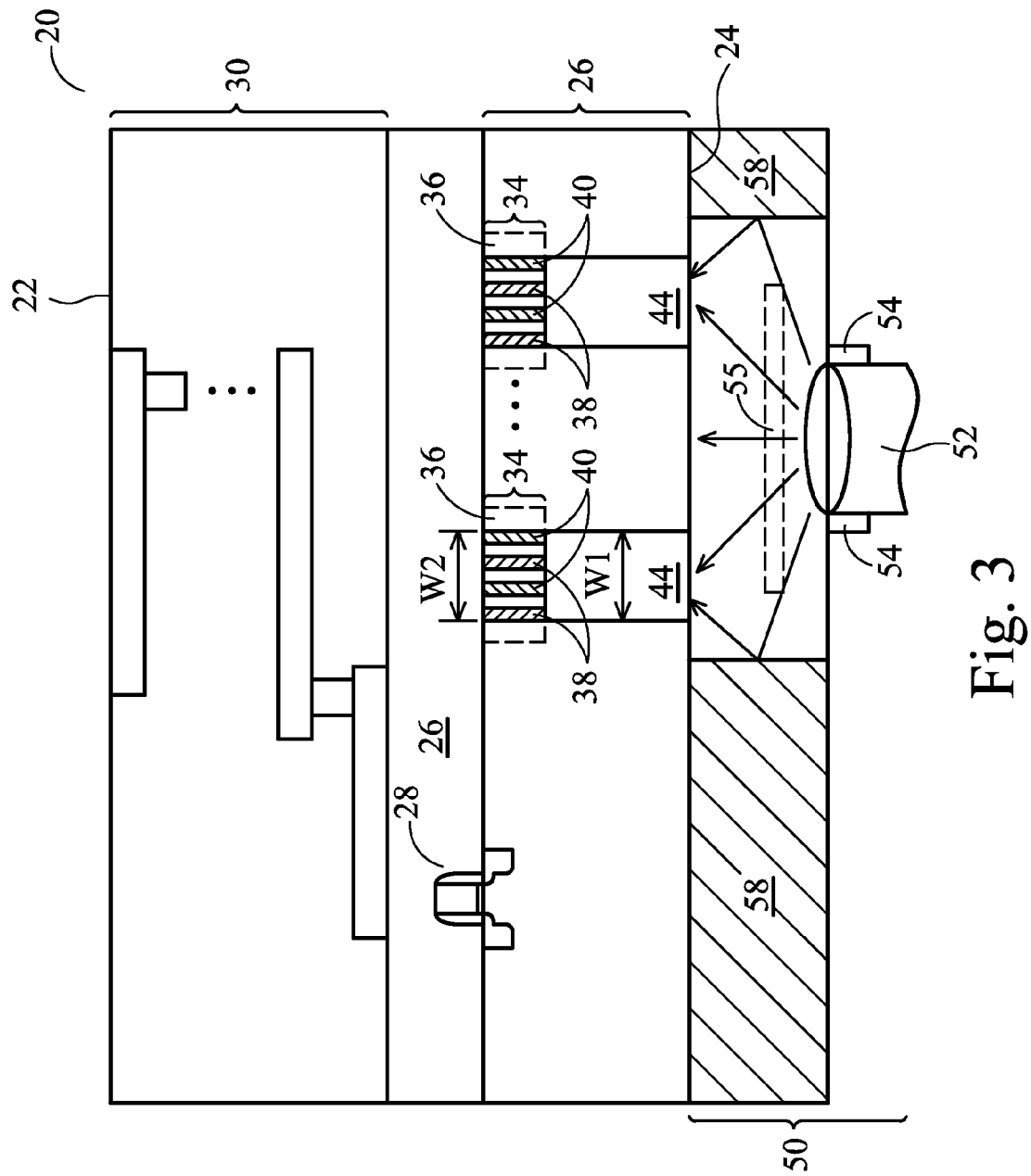
FIG. 3 illustrates an embodiment including through-silicon vias exposed to a cavity encircled by a cladding material.

FIG. 3 illustrates yet another embodiment of the present invention, in which cavity 56, which may be a multi-mode interference (MMI) cavity, is provided for receiving the light emitted by light source 52. Cavity 56 may be an air cavity, or filled with the material transparent to the wavelength of the light, as discussed in the preceding paragraphs. In this case, cavity 56 is still referred to as a "cavity" for its transparent property for the light. Cavity 56 may be surrounded by cladding material 58, which may be formed, for example, of silicon oxide. In this case, cladding material 58 may serve the purpose of reflecting the light or absorbing the light to avoid interference to TSVs 44 or photo detectors. Again, light distributor 55 may be formed between light source 52 and TSVs 44, and may be placed in cavity 56.

The embodiments of the present invention have several advantageous features. With TSVs formed on the back of semiconductor substrates, the light carrying the optical clock signals pass through the TSVs to reach photon detectors with little (if any) attenuation. Photon detectors may thus receive the light with greater strength. The light may be easily split to multiple TSVs, and converted to electrical clock signal where they are needed, instead of being redistributed from a central electrical clock signal. Hence, the requirement for redistributing electrical clock signals is relieved. As a result, less heat will be generated. Further, without the need to route the generated electrical clock signals through metallization layers, glitches are less likely to occur. Simulations results have revealed that by using the embodiments of the present invention, the clock signals may be speed up from about 2 GHz to about 10 GHz with no substantial glitches observed. Further, simulations results have revealed that the power consumption of clock trees may be reduced by about 40 percent, and the routing resources used by the clock trees may be reduced by about 40 percent also. An additional advantageous feature of the present invention is that the optical clock signals are input from the backside of chip 20, and hence will not interfere the routing of metallization layers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An integrated circuit structure comprising:
a semiconductor chip comprising a front surface and a back surface;
a via extending from the back surface of the semiconductor chip into the semiconductor chip, wherein the via is light transparent; and
a photon detector in the semiconductor chip and exposed to the via, wherein the semiconductor chip comprises a semiconductor substrate, wherein the photon detector is adjacent to a top surface of the semiconductor substrate, the top surface of the semiconductor substrate being parallel to and spaced from the front surface of the semiconductor chip, and wherein the via extends from a back surface of the semiconductor substrate to a bottom surface of the photon detector, the via not extending completely through the semiconductor substrate.

2. The integrated circuit structure of claim 1, wherein the via is an air-via.

3. The integrated circuit structure of claim 1, wherein the via is filled with a dielectric material.

4. The integrated circuit structure of claim 1 further comprising a light source aiming at the via, wherein the light source is mounted onto the semiconductor chip.

5. The integrated circuit structure of claim 1, wherein the semiconductor substrate has a silicon-on-insulator structure comprising a semiconductor layer on a dielectric layer, wherein the photon detector extends to a bottom of the semiconductor layer, and wherein the via extends through the dielectric layer.

6. The integrated circuit structure of claim 1 further comprising:
a cladding material underlying the back surface of the semiconductor chip; and
a cavity in the cladding material, wherein the cavity adjoins the via, and is encircled by the cladding material.

7. An integrated circuit structure comprising:
a semiconductor substrate comprising a front surface and a back surface that is opposite to the front surface, an integrated circuit being formed on the front surface of the semiconductor substrate;
metallization layers over the semiconductor substrate;
a through-silicon via (TSV) extending from the back surface of the semiconductor substrate into the semiconductor substrate, but not completely through the semiconductor substrate;
a photon detector in the semiconductor substrate and exposed to the TSV; and
a light source attached to the semiconductor substrate, and aiming at the TSV, wherein the light source is configured to emit light, and wherein the TSV is transparent to a light emitted by the light source.

8. The integrated circuit structure of claim 7, wherein the TSV is an air-via.

9. The integrated circuit structure of claim 7, wherein the TSV is filled with a light transparent dielectric material.

10. The integrated circuit structure of claim 7 further comprising:
a plurality of TSVs extending from the back surface of the semiconductor substrate into the semiconductor substrate; and
a plurality of photon detectors in the semiconductor substrate, wherein each of the plurality of photon detectors is exposed to one of the plurality of TSVs.

11. The integrated circuit structure of claim 10, wherein the light source is configured to project light to all of the plurality of TSVs.

12. The integrated circuit structure of claim 10 further comprising:
a cladding material underlying the back surface of the semiconductor substrate; and
a cavity encircled by the cladding material and between the light source and the back surface of the semiconductor substrate, wherein the plurality of TSVs are exposed to the cavity.

13. The integrated circuit structure of claim 10 further comprising a light distributor between the back surface of the semiconductor substrate and the light source.

14. The integrated circuit structure of claim 7, wherein a spacing between the light source and the back surface of the semiconductor substrate is filled with air.

15. An integrated circuit structure comprising:
a semiconductor substrate comprising a front surface and a back surface that is opposite to the front surface;
metallization layers over the semiconductor substrate;
a plurality of through-silicon vias (TSVs) extending from the back surface of the semiconductor substrate into the semiconductor substrate, the plurality of TSVs not extending completely through the semiconductor substrate;
a plurality of photon detectors in the semiconductor substrate, wherein each of the plurality of photon detectors is exposed to one of the plurality of TSVs; and
a light source attached to the semiconductor substrate and configured to project light to the plurality of TSVs, wherein the plurality of TSVs are filled with a transparent dielectric material.

16. The integrated circuit structure of claim 15 further comprising:
a cladding material underlying the back surface of the semiconductor substrate; and
a cavity encircled by the cladding material, wherein the plurality of TSVs are exposed to the cavity.

17. The integrated circuit structure of claim 16, wherein the cavity is filled with air.

18. The integrated circuit structure of claim 15 further comprising a light distributor between the back surface of the semiconductor substrate and the light source.

19. The integrated circuit structure of claim 18, wherein a spacing between the light distributor and the back surface of the semiconductor substrate is filled with air.

* * * * *